March 8, 1955 W. B. CART 2,703,736
SELF-ALIGNING THRUST BLOCK FOR THRUST BEARINGS
Filed July 17, 1951

Inventor
Ward B. Cart
by T. Lloyd La Fare
Attorney

United States Patent Office

2,703,736
Patented Mar. 8, 1955

2,703,736

SELF-ALIGNING THRUST BLOCK FOR THRUST BEARINGS

Ward B. Cart, West Milwaukee, Wis., assignor to Allis-Chalmers Manufacturing Company, Milwaukee, Wis.

Application July 17, 1951, Serial No. 237,187

1 Claim. (Cl. 308—140)

This invention relates to a thrust bearing for a vertical shaft machine and particularly to a thrust bearing of the type having cooperating bearing surfaces in a plane normal to the axis of the shaft.

In machines such as a vertical generator the shaft is relatively long for coupling to a prime mover such as a hydraulic turbine. The bearing comprises a thrust collar and a runner block rotatable with the shaft. It is necessary that the collar seat on the runner so that the bearing surface of the runner lies in a predetermined plane which is normal to the geometrical axis of the shaft. Because of the relatively great length of the shaft between the thrust bearing and the shaft coupling, slight errors or defects in the adjustment of the thrust collar cause a radial wobble of the shaft about the axis of rotation and a shaft runout at the shaft coupling which may exceed the permissible limit. Heretofore, when the thrust collar would not permit proper alignment of the runner because of machining errors or any defect resulting from removal and reassembly of the bearing, proper alignment was obtained by the insertion of tapered annular shims between the thrust collar and the runner block. These shims were hand fitted, and this operation included numerous trial and error spottings and scrapings of the shims. Such a method of alignment has proven both slow and expensive.

To eliminate the use of shims in aligning a thrust bearing of the type considered and to reduce the time heretofore required for such alignment, it is advantageous to have a thrust collar which is not rigidly mounted to the shaft but which supports the shaft on a spherical seat so that the thrust collar may be angularly adjusted with respect to the geometrical axis of the shaft.

It is therefore an object of the present invention to provide a shaft thrust bearing with improved means for rendering the bearing surface of the rotatable member normal to the geometrical axis of the shaft.

Another object of the invention is to provide a thrust bearing in which the thrust collar may be adjusted with respect to the shaft for rendering the plane of the bearing surface of the rotatable member normal to the geometrical axis of the shaft.

Figure 1:
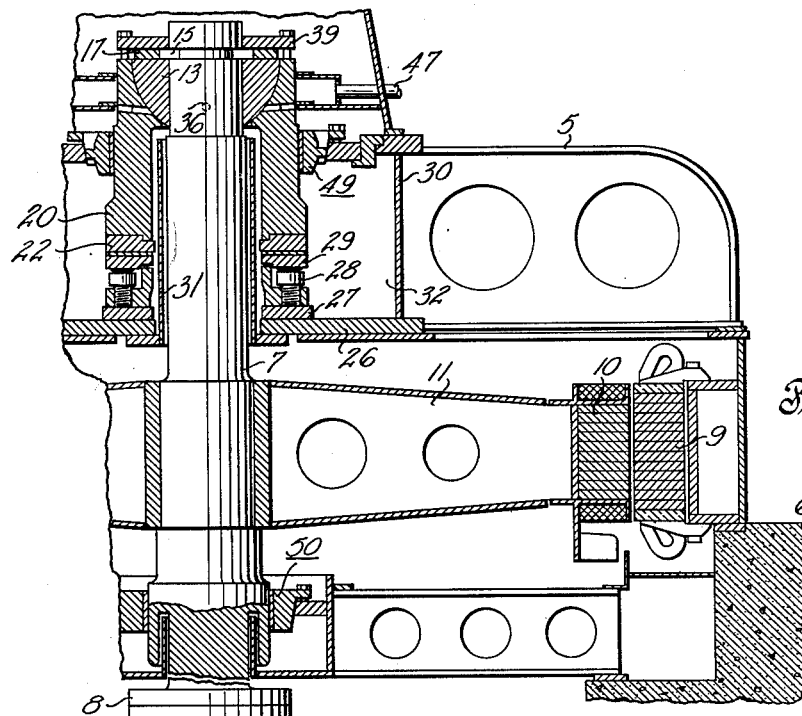
Figure 2:
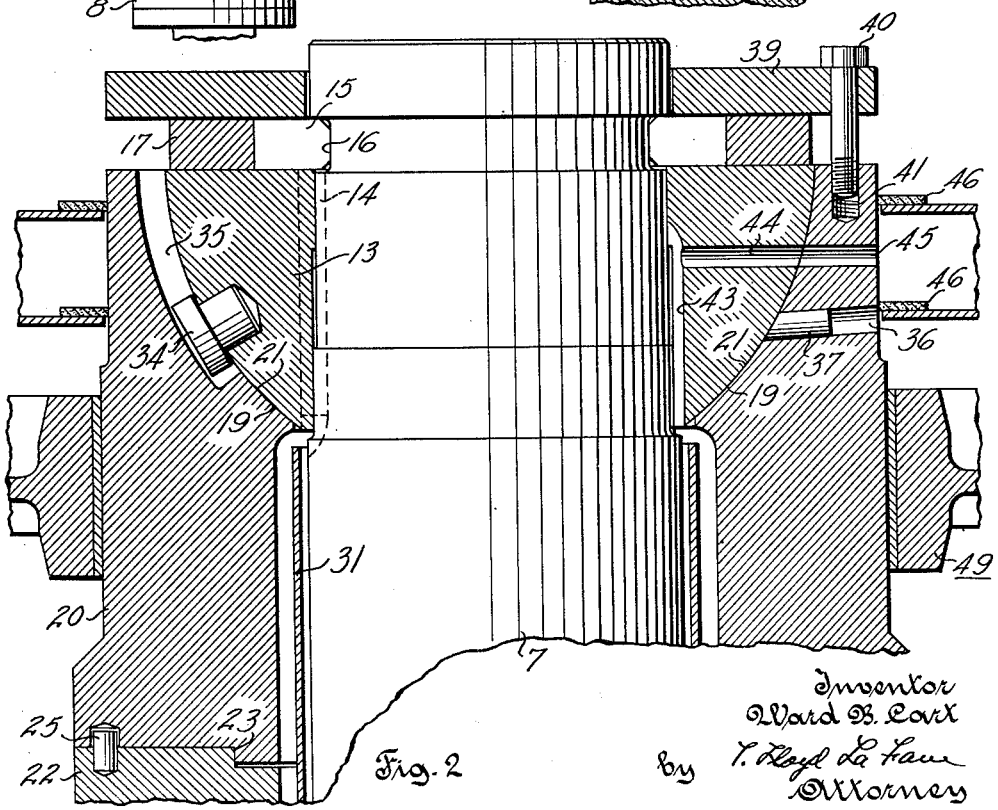

Other objects and advantages will be apparent from a consideration of the following description taken with the accompanying drawing, in which:

Fig. 1 is a view in vertical cross section of a portion of a vertical shaft dynamoelecrtic machine comprising a rotatable member supported by a thrust bearing embodying the present invention; and Fig. 2 is an enlarged view in vertical cross section of some of the elements of the thrust bearing shown in Fig. 1.

Referring more particularly to the drawing, numeral 5 indicates the frame or housing of a vertical shaft dynamoelectric machine supported on a foundation 6. The dynamoelectric machine may be a generator having a relatively long shaft 7 with a flange 8 for coupling to a hydraulic turbine (not shown). The generator comprises an armature 9 secured within the housing and, for rotation within the armature, a field member 10 mounted on a rotor spider 11 secured to the shaft.

The shaft 7 is supported on the machine housing through a thrust bearinng embodying the present invention. The thrust bearing includes a member rotatable with the shaft about a vertical axis and a stationary member. The rotatable member comprises a thrust block 13 which may be integral with the shaft or secured thereto in an interference fit but which preferably, to be removable, is fitted over the shaft as a slip-fit and is provided with a key 14 to prevent rotation therebetween. To axially secure the thrust block 13 in position on the shaft, a split ring 15 is forced in a circumferential groove 16 about the shaft in binding relation with the thrust block 13 and the upper side of the circumferential groove. A solid retaining ring 17 is forced fitted over the split ring to lock it in place. The solid ring 17 seats on the thrust block 13 and does not extend radially beyond the thrust block.

The thrust block 13 has an outer convex surface 19 which is spherical with its center of curvature on the geometrical axis of the shaft. To support the thrust block, a thrust collar 20 is disposed about the shaft and has an upper concave surface 21 which is spherical having the same radius and center of curvature as the spherical surface of the thrust block so the two spherical surfaces 19, 21 engage each other. The thrust collar extends longitudinally of the shaft and rests on a runner 22 which is a ring having a plane surface normal to the geometrical axis of the shaft for engagement with the bearing surface of the stationary member. The lower end of the thrust collar has a shoulder 23 forming a ring projection against which the runner abuts to prevent relative lateral displacement between the thrust collar and the runner. One or more dowel pins 25 disposed between the thrust collar and the runner prevent relative rotation therebetween.

The runner cooperates with the bearing of the stationary member in a well known manner. The stationary member comprises a deck 26 secured to the frame 5 for supporting the thrust load. An annular base 27 is secured on the deck. The base contains circumferentially spaced and axially disposed jack screws 28 which support a suitable bearing which may be a plane type ring but is preferably a ring of tiltable bearing shoes 29. The shoes 29 form a bearing surface in a horizontal plane which is normal to the axis of rotation of the shaft.

A housing 30 is supported on the deck spaced from the bearing. A sleeve 31 coaxial with the shaft and the bearing is disposed therebetween in spaced relation and secured to the deck 26. The sleeve extends from the deck to the upper portion of the thrust collar. The sleeve 31, the housing 30, and the deck 26 define therebetween a chamber 32 to hold oil to a suitable level for lubrication of the bearing elements.

The spherical mating surfaces 19, 21 of the thrust block and thrust collar provide means permitting self-adjustment of the block and the collar with respect to each other for centering the shaft and for aligning the runner so the plane of its bearing surface is normal to the geometrical axis of the shaft. To prevent relative movement between the thrust block and the thrust collar due to torque of the shaft, a pin or dowel 34 is secured in the thrust block with the head of the dowel disposed in an elongated slot 35 which lies in a plane including the axis of the shaft. The head of the dowel is smaller in width than the width of the slot, so that there is clearance between one wall and the dowel when the dowel is in contact with the opposite wall. The dowel may move in the slot to allow for pivotal movement of the shaft and the block relative to the collar.

To prevent freezing of the block 13 on the collar 20 and to facilitate movement therebetween, the thrust collar is provided with a plurality of drilled lubricating holes 36 in which porous bronze inserts 37 are disposed for contact with the spherical surface of thrust block. The holes 36 are downwardly inclined from the radially outer surface of the thrust collar to the radially inner surface thereof, so that the upper portion of each hole, unfilled by the insert, forms a well for trapping oil which may condense from oil vapor present above the oil chamber.

Means for adjusting the relative position of the thrust block and the thrust collar may comprise a leverage arrangement for displacing the collar on the block. The leverage arrangement shown comprises an apertured plate 39 disposed over the shaft and on the split ring 15 and solid ring 17 with a portion extending radially beyond the solid ring and above the top of the thrust collar 20. Plate 39 may be made integral with solid ring 17. A bolt 40 extending through a hole in the plate may engage a tapped hole 41 in the top of the thrust collar. Tightening the bolt causes the collar to pivot on the block as the collar is drawn by the bolt toward the plate. If it is desired to pivot the collar in other directions the bolt may similarly be employed to engage other tapped holes in the thrust collar on other sides of the shaft.

In order to prevent oil being forced from the chamber 32 over the top of the sleeve 31 by pressure differences which may exist within the housing, a duct opening to the atmosphere is provided comprising an axial groove 43 on the radially inner side of the thrust block which groove opens to the space adjacent the sleeve and which connects with a hole 44 drilled radially through the thrust block. A hole 45 drilled radially through the thrust collar is aligned with the hole 44 in the thrust block. A suitable oil vapor seal is disposed coaxially of the thrust collar and has spaced seal elements 46 engaging the collar above and below the hole 45. A pipe 47 leads from the channel formed by the vapor seal elements through the housing to the atmosphere.

To center the shaft suitable known radial guide bearings 49, 50 are provided. Guide bearing 49 is disposed radially of the thrust collar and is secured to the housing. Guide bearing 50 is disposed radially of the shaft between the rotor spider and the shaft coupling and is supported from the foundation through a suitable deck member.

After the vertical shaft dynamoelectric machine has been assembled with its stationary bearing properly adjusted and the shaft centered, the thrust collar adjusting means comprising bolt 40 should be removed before operating the machine. Inasmuch as a very small error in obtaining the alignment of the runner bearing surface normal to the axis of the shaft produces a magnified wobble or deviation from a predetermined axis of the long shaft at the shaft coupling, it may be necessary to further pivot the thrust collar on the thrust block to better align the runner bearing. This may be done by employing suitable known marking devices to indicate the position of shaft deviation, and then with the machine at standstill to again adjust the thrust collar by the means including the plate 39 and a bolt 40, as described above.

Although but one embodiment of the invention has been shown and described, it will be apparent to one skilled in the art that various changes or modifications may be made therein without departing from the spirit of the invention or from the scope of the appended claims. In particular, the invention is applicable to shafts having their geometrical axis either horizontal or sloping at any angle with the horizontal.

It is claimed and desired to secure by Letters Patent:

A thrust bearing for a vertical shaft carrying rotating machinery, the center of gravity of said shaft with said machinery being located below said bearing, said bearing comprising a thrust member rotatable with said shaft and comprising an annular block rigidly mounted on said shaft and having a convex surface consisting of a portion of the lower half of a spherical surface, a collar having a concave surface consisting of a portion of the lower half of a spherical surface in mating engagement with said spherical surface of said block, a runner bearing element secured to said collar and having an annular bearing surface, a stationary member having an annular bearing surface in a plane normal to the axis of rotation of said shaft, said bearing surface of said stationary member being in cooperative engagement with said runner bearing surface, said spherical surfaces having their common center of curvature on the geometrical axis of said shaft above said spherical surfaces to provide minimum radii for said spherical surfaces and a maximum moment arm to gravitational forces acting on said shaft and said machinery to pivot said shaft and said block with respect to said collar to maintain the geometrical axis of said shaft vertical, a radially extending annular plate spaced axially of said collar and positioned on said block, and removable means mounted on said plate to vary the spacing between said plate and said thrust collar to adjust the angular position of said thrust collar relative to said block to bring said runner bearing surface of said thrust member normal to the geometrical axis of said shaft when the shaft is at standstill.

References Cited in the file of this patent

UNITED STATES PATENTS

| | | |
|---|---|---|
| 1,436,265 | Kingsbury | Nov. 21, 1922 |
| 1,876,690 | Kingsbury | Sept. 13, 1932 |
| 2,129,992 | De Mattia | Sept. 13, 1938 |
| 2,508,089 | Barrot | May 16, 1950 |